July 1, 1958 E. H. HAUGEN 2,841,337
HOT WATER HEATING SYSTEM
Filed June 3, 1953 5 Sheets-Sheet 1
Fig.1
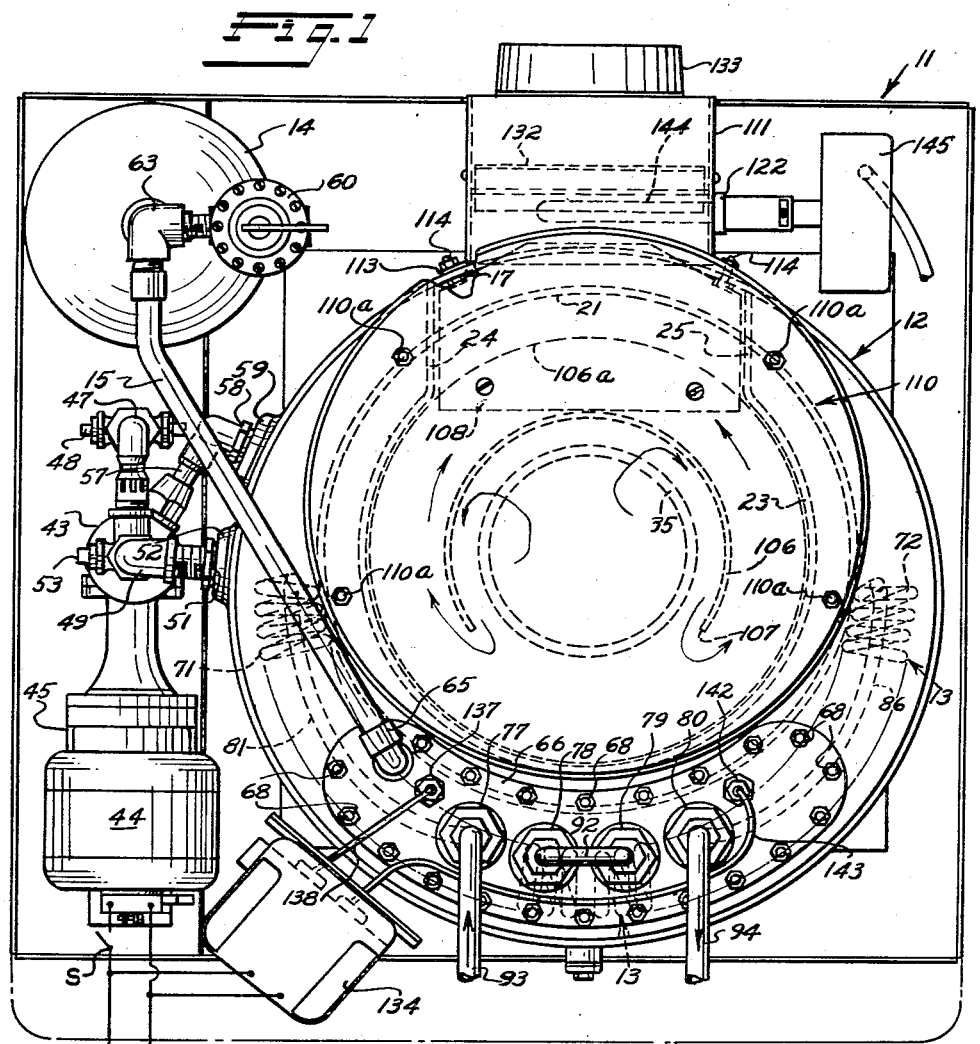
Fig.1-A
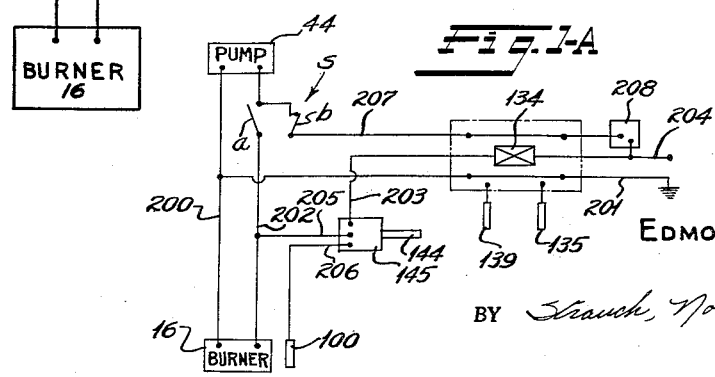
INVENTOR
EDMOND H. HAUGEN
BY Strauch, Nolan & Diggins
ATTORNEYS July 1, 1958  E. H. HAUGEN  2,841,337
HOT WATER HEATING SYSTEM
Filed June 3, 1953  5 Sheets-Sheet 3

INVENTOR
EDMOND H. HAUGEN
BY Strauch, Nolan & Diggins
ATTORNEYS

July 1, 1958 E. H. HAUGEN 2,841,337
HOT WATER HEATING SYSTEM
Filed June 3, 1953 5 Sheets-Sheet 4

INVENTOR
EDMOND H. HAUGEN

ATTORNEYS

July 1, 1958

E. H. HAUGEN 2,841,337

HOT WATER HEATING SYSTEM

Filed June 3, 1953

INVENTOR
EDMOND H. HAUGEN

BY *Strauch, Nolan & Diggins*

ATTORNEYS

United States Patent Office 2,841,337
Patented July 1, 1958

2,841,337

HOT WATER HEATING SYSTEM

Edmond H. Haugen, Ann Arbor, Mich., assignor, by mesne assignments, to Iron Fireman Manufacturing Company, Cleveland, Ohio, a corporation of Oregon Application June 3, 1953, Serial No. 359,303

10 Claims. (Cl. 237—8)

This application relates to heater apparatus and particularly to such wherein domestic hot water and hot water for the radiators or other space heating devices are heated by a common burner. This is a continuation-in-part of my co-pending application Serial No. 182,565 filed August 31, 1950 which has become Patent No. 2,805,648, September 10, 1957.

Since the recent war there has been considerable expansion in housing, particularly in the field of small houses, more of which are being built because of the increased costs of building. Many of these small houses have no basements and must install the entire heating unit in either the kitchen or a utility room on the first floor. The heater apparatus of the present invention is particularly adaptable for small houses, and essentially it comprises a special fabricated boiler within which is mounted a wall flame oil burner, the boiler being surrounded by an insulating cabinet so that it is a fire proof insulated unit that does not radiate much heat into the surrounding room, and special arrangements are provided for heating the domestic hot water. Preferably the domestic hot water coil is suspended within the water space of the boiler. Details of these and other novel assemblies and sub-assemblies will appear as the description proceeds.

It is a major object of my invention to provide a heater apparatus wherein the coil assembly for instantaneously heating domestic water is mounted within the water space of the boiler and novel controls are provided.

It is a further object of the invention to provide a novel control system in a hot water boiler and domestic hot water combination apparatus wherein controls for the burner are connected to thermostats located in the boiler water adjacent inlet and outlet sections of the domestic hot water coil, so as to be immediately responsive to cooling of the boiler water when hot water is drawn off from the domestic tap and so as to constitute a limit control as to the temperature of the domestic hot water.

It is a further object of the invention to provide a novel water pumping and distributing system for a hot water heater wherein hot water drawn from the bottom of the boiler is admixed with cool return water near the pump inlet.

A further object of the invention is to provide a novel boiler construction for a hot water heater wherein certain of the walls are eccentric or otherwise relatively more widely spaced than others to provide room for a coil for circulating domestic water to be heated through the hot water boiler space without unduly interfering with circulation of boiler water.

It is a further object of the invention to provide a novel combination of a boiler and domestic hot water heater wherein the coil for the domestic hot water is mounted as a unit upon a plate or other closure member secured to the top wall of the boiler whereby the coil is suspended freely in the boiler water.

It is a further object of the invention to provide a novel domestic water coil arrangement and mounting for a hot water heater.

A further object of the invention is to provide a novel boiler, expansion tank and water distribution and pumping assembly, all in novel relation in a compact water heater specially adapted for small houses.

A further object of the invention is to provide a novel automatic draft stabilizer assembly wherein air from a point adjacent the bottom of the heater is drawn upwardly through a passage and combined with the outgoing combustion products.

Further objects of the invention will presently appear as the description proceeds in connection with the appended claims and the annexed drawings wherein:

Figure 1 is a top plan view of a hot water heater according to a preferred embodiment of the invention, partially broken away to show certain details and particularly showing the arrangement of the boiler, the domestic water heater coil mounting, the pump and distribution piping, and the expansion tank;

Figure 1A is a separate diagram of the control circuits;

Figure 2:
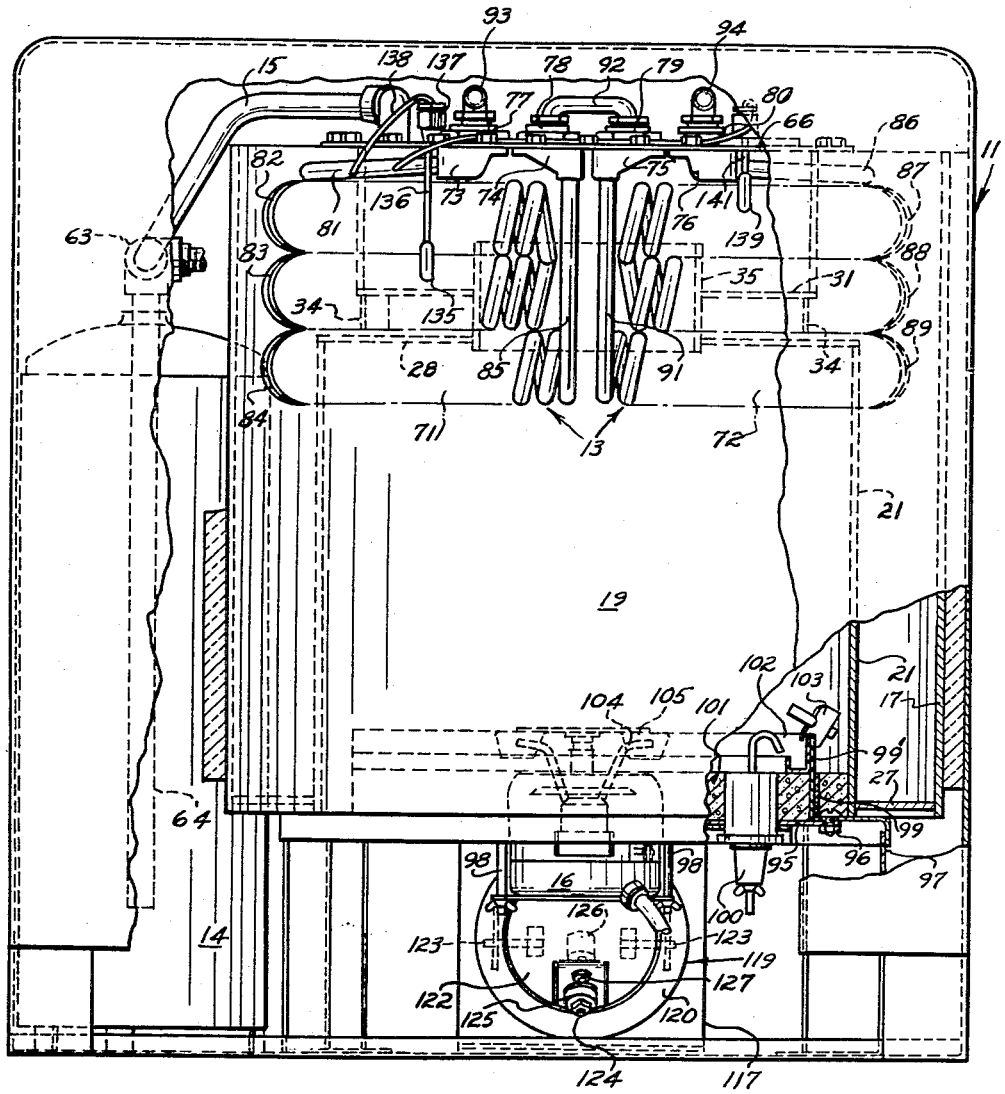
Figure 2 is a front elevation of the water heater of Figure 1, broken away to illustrate the suspension mounting of the coil assembly for heating domestic hot water.
Figures 6, 7:
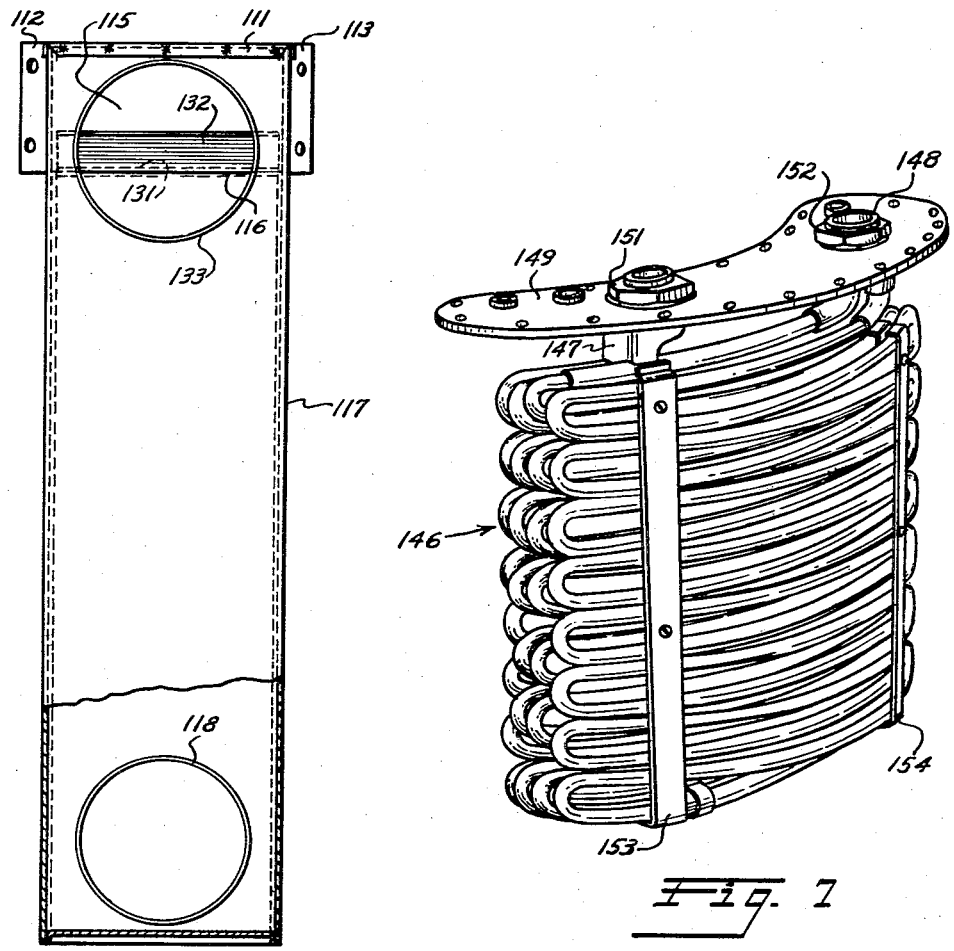

Figure 6 is a rear elevation of the draft stabilizer unit apart from its assembly with the rest of the water heater illustrating particularly the deflector where the draft air joins the combustion gases before passing into the flue; and Figure 7 is a photographic view of a domestic water heating coil and mounting plate wherein only a single coil is used and which may be substituted for the dual coil unit illustrated in Figures 1 and 2.

The novel water heater apparatus of my invention comprises a cabinet 11 surrounding a boiler 12 which has mounted in it a domestic hot water heating coil assembly indicated at 13. Boiler 12 is connected to an expansion tank 14, as by a suitable pipe 15. A burner unit, which is preferably a wall flame oil burner 16, is mounted on a hearth at the bottom of the boiler, and after traversing the combustion chamber within the boiler the products of combustion escape through a flue assembly.

Figure 5:
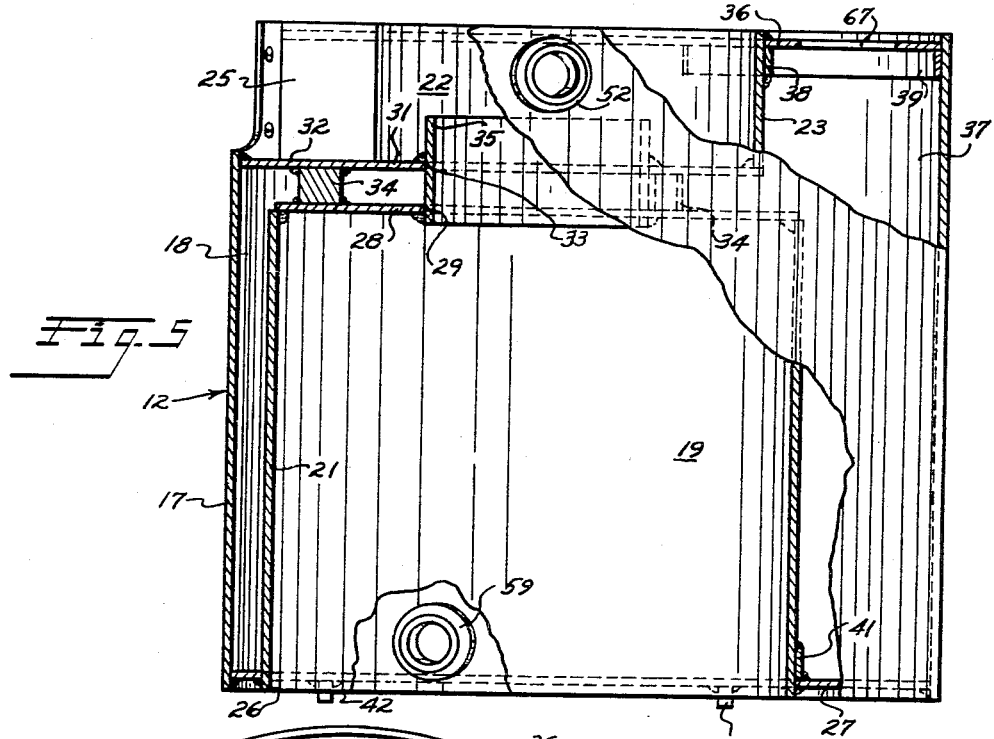
Figure 5 is a side elevation, mainly in section through the boiler of Figure 4.
Figure 4:
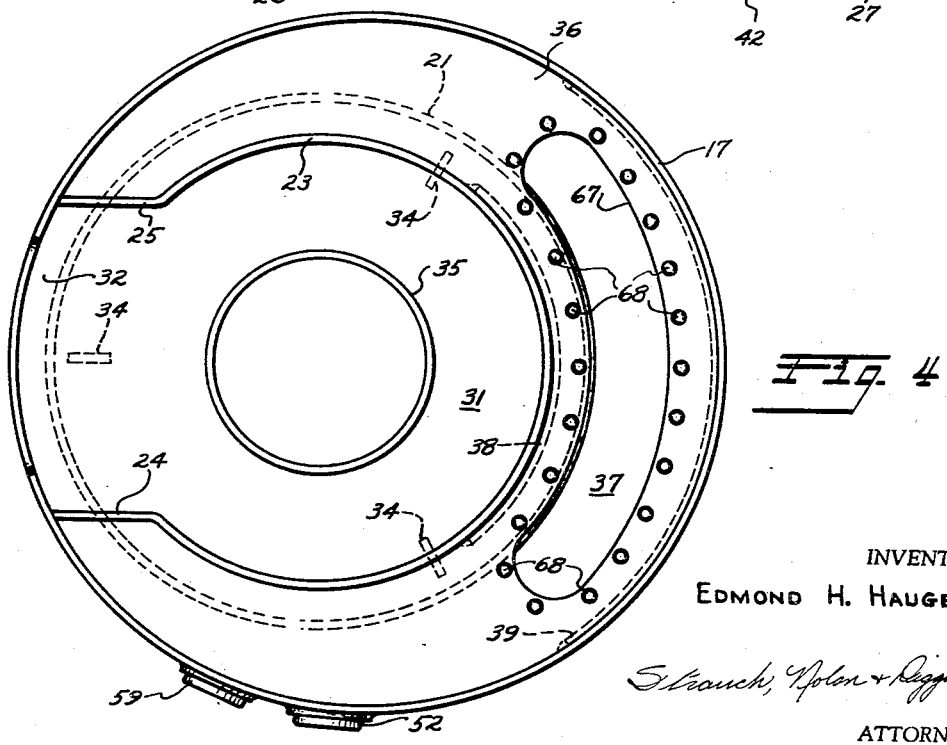
Figure 4 is a top plan view of a unitary welded sheet metal boiler having eccentric inner and outer walls which is used in the preferred embodiment of my invention.

Boiler 12 is best illustrated in Figures 4 and 5 wherein the boiler walls are all made of sheet steel sections having a gage of about one-fourth of an inch permanently welded together with water tight joints to provide a novel unitary water backed combustion chamber.

The boiler assembly comprises an outer cylindrical member 17 that defines the outer wall of the water space 18 within the boiler. The lower part of the combustion chamber within the boiler or what is known as the primary combustion chamber 19 is surrounded by a cylindrical member 21 displaced rearwardly from the front of the unit so as to appear in plan (Figure 4) as eccentric with respect to outer wall member 17. Member 21 defines the lower inner wall of the boiler water space.

The upper or secondary combustion chamber 22 is surrounded by a wall member 23 which is mainly cylindrical and concentric with the lower combustion chamber wall 21 but is formed with rearwardly projecting walls 24 and 25 to provide a flue connecting throat as indicated in Figure 4. The bottom of lower combustion chamber 19 is open as indicated at 26 to receive the burner and flame rim as will appear. The bottom of the water space between walls 17 and 21 is closed by a suitably shaped annular steel member 27 which is known as a mud ring and is welded at its inner and outer peripheries to walls 17 and 21, thereby sealing off the entire bottom of the boiler assembly. The top of lower combustion chamber 19 is defined by a circular steel plate 28 welded about its periphery to member 21 and it has a circular opening 29 concentric with member 21. The bottom of secondary combustion chamber 22 is closed by a generally circular welded plate 31 concentric with member 23 which, at the flue outlet side, is provided with an extension 32 that extends into contact with the inner surface of the outer boiler wall 17. A central aperture 33 is formed in plate 31.

Walls 28 and 31 are parallel and horizontal and are spaced apart as illustrated. A series of small spacer blocks 34 are welded between them in the water space to aid in maintaining them apart. In addition walls 28 and 31 are connected by a cylindrical collar 35 which is welded within openings 29 and 33, and projects up into the uper combustion chamber as illustrated in Figure 5. The boiler top wall is a generally C-shaped steel plate 36 that extends from wall 24 to wall 25, being welded to the tops of these walls and member 23 so as to complete the top closure of the boiler water space.

I have thus provided an all steel welded plate boiler unit wherein the entire water space is sealed by welded joints. Lower wall 21 provides a continuous smooth water backed surface in the primary combustion chamber. The products of combustion successively traverse primary combustion chamber 19, throat 35, upper combustion chamber 22 and the outlet above extension 32 between walls 24 and 25. The eccentric arrangement of the inner and outer boiler walls provides a large area forward water space 37 wherein the coil assembly for the domestic hot water supply may be disposed as will appear. It is obvious that space 37 need not be defined by eccentric circular walls, although that structure has been found extremely adaptable to speed of assembly and efficient boiler operation, but may be defined by other wall arrangements.

While I have here described my boiler as made up of circular walled sections, it will be understood that the overall scope of the invention is not so limited. One limit on the size of circular boilers is the maximum diameter that can pass through the usual building doorway. The boiler therefore may be oval or generally rectangular in shape, since sheet steel may be readily worked to obtain the optimum shape. It has been found that generally rectangular and oval boilers can be increased in length while maintaining the maximum permissible width, thereby providing a higher output.

Within the boiler unit support strips 38 and 39 welded to walls 23 and 17 respectively help to support upper wall 36 from below. Above bottom wall 27 a series of spaced projections 41 are welded to the boiler walls for locating wall 27 in the assembly. A plurality of lugs 42 are welded to depend from mud ring 27 below the level of the surrounding walls 21 and 17 for mounting the boiler on the rest of the hearth assembly.

Figure 3:
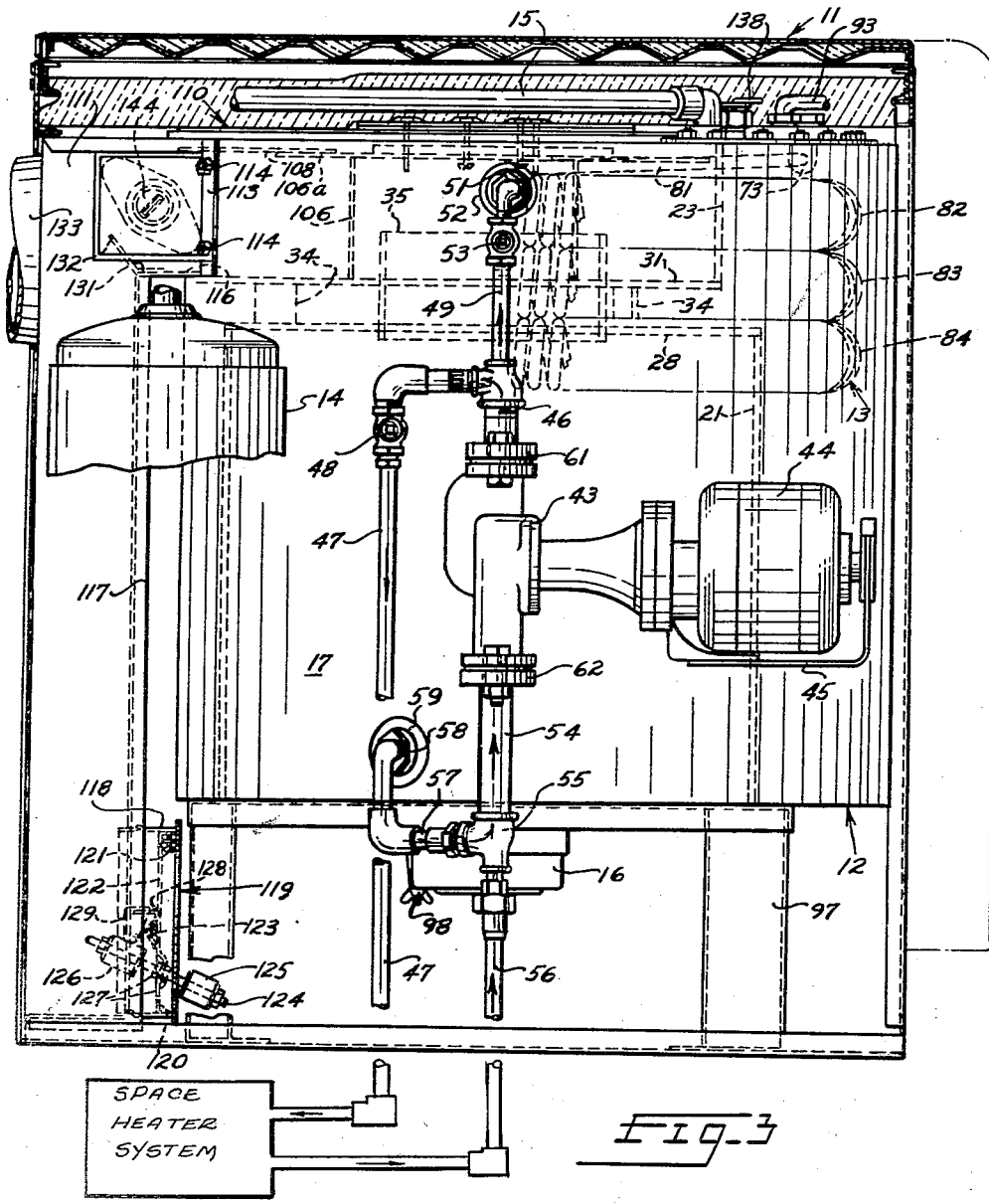
Figure 3 is a side elevation of the water heater of Figures 1 and 2, illustrating the water distribution arrangements and partially broken away to show the pump mounting and the draft stabilizer.

Figures 1–3 illustrate the water distribution system for pumping the hot water from the boiler to the radiators or other space heating devices of the house and return. It essentially comprises a pump 43 driven by an electric motor 44. The pump and motor assembly may be mounted on a bracket 45 connected to the frame of the surrounding cabinet. In most embodiments of the invention, however, the pump assembly and connected piping provide a self supporting rigid assembly needing no added support from the cabinet. The outlet side of the pump is connected by means of a coupling or T fitting 46 with a pipe 47 which leads down and thence to the space heaters. A valve 48 is provided in this line. A pipe 49 is connected to another outlet in coupling 46 and to a fitting 51 threaded into a flange 52 in wall 17 of the boiler. Fitting 51 is located at the top of the boiler water space so that any water pumped up through pipe 49 will return directly into the top of the boiler. A valve 53 is provided in line 49. Valves 48 and 53 are adjustable to control the rate of flow of water therethrough but either may be shut off completely as will appear.

The inlet side of pump 43 is connected by a pipe 54 with a coupling or T fitting 55 having one inlet connected to the return line 56 from the space heaters (not shown). The other inlet of coupling 55 is connected by a pipe 57 to a fitting 58 threaded into a flanged outlet 59 in the lower part of boiler wall 17. The outlet and inlet sides of pump 43 are connected to pipes 49 and 54 respectively through adapter flange assemblies 61 and 62 respectively which enable the pump to be readily removed for repair or replacement.

During operation of the pump, hot water from the lower part of the boiler is drawn off through pipe 57, coupling 55 and pipe 54 and pumped out through coupling 46. If valve 48 is closed, as it may be during the summer when space heating is not necessary and the action of convection currents within the boiler water space is not adequate to suitably heat the domestic hot water, valve 53 is opened. All of the hot water will thus be pumped through pipe 49 into the top of the boiler, providing a forced recirculation of the boiler water that speedily results in heating of all the boiler water for quickly indirectly heating the suspended domestic water coil.

When, as in the winter, it is desired to circulate hot water through the radiators as when heat is demanded in the house, both valves 48 and 53 are open and the flow through coupling 46 splits as indicated in Figure 3. The valves 48 and 53 are suitably adjusted to provide the desired rate of flow of water in each circuit. Under these conditions the hot water being pumped out of the boiler where it is lowest in temperature is admixed with some of the cooler return water before it is pumped upwardly to pass partly out through into the system and partly back into the top of the boiler. In this manner I am enabled to raise the average boiler water temperature and maintain a more uniform heating temperature for the water in the space heating system throughout the house and to maintain the temperature of the domestic hot water at a higher level. If for some reason it is desired to maintain circulation through the radiators while the domestic water coil is being repaired, or if the coil is omitted and a substitute or separate source of domestic hot water is used, valve 53 in the upper pipe may be closed and valve 48 more widely opened to allow more direct circulation from the boiler to the radiators.

The vertical expansion tank 14 is shown in Figures 1, 2 and 3. This tank, which is large enough to supply the requirements of the connected heating system, is rigidly supported on the framework within one corner of the cabinet preferably with its bottom spaced above the floor of the cabinet. Above tank 14 is a coupling 63 from which depends a pipe 64 that extends through a top flanged opening in the tank down nearly to the bottom within the tank, so that any water which enters the tank will be deposited near its bottom. Expansion tank 14 is connected to the boiler through coupling 63 and pipe 15, the latter being shown in Figure 1 as extending over the top of the boiler to a union 65 that is threaded into an aperture in the plate 66 that supports the domestic water heating coil. In this manner, any excess water in the space heating system that arises out of expansion of the heated boiler water will overflow through pipe 15 into the expansion tank. A safety valve 60 for the system is also connected to coupling 63 as illustrated in Figure 1. By providing a vertical tank which reduces the contact surface between the air and water, and which prevents circulation of water at the air-water boundary, I have virtually eliminated air absorbtion in the expansion tank and transfer of such air to the heating system where it lodges and is harmful to operation and efficiency of the system.

An extremely important feature of my invention is the fact that the coil assembly 13 for heating the domestic hot water is readily removably mounted in the heater. Top wall 36 of the boiler is formed with an arcuate elongated, generally kidney-shaped opening 67 that is closed by similarly shaped plate 66 attached to the top wall of the boiler unit as by a plurality of studs 68. Plate 66 in effect forms a part of the top boiler wall and the coil 13 itself is entirely suspended from it in the boiler water. Normally plate 66 is tightly fastened upon the top wall of the boiler with suitable gaskets between them.

Referring to Figure 2, the domestic hot water heating coil assembly comprises two separate coils of copper tubing 71 and 72. Plate 66 is formed with suitable openings through which project threaded nipples upstanding from fittings 73, 74, 75 and 76. Nuts 77—80 on the respective nipples clamp these fittings tightly to the underside of plate 66. Coil 71 comprises a continuous tube having an end portion 81 connected to fitting 73, three vertically spaced cylindrically coiled horizontal sections 82, 83 and 84 in series, and a riser 85 connected to fitting 74. Coil 72 comprises a continuous tube having an end portion 86 connected to fitting 76, three vertically spaced cylindrically coiled horizontal sections 87, 88 and 89 in series and a riser 91 connected to fitting 75.

Coils 71 and 72 are connected in series by a jumper tube 92 connecting the nipples of fittings 74 and 75 above plate 66. The fitting 73 is connected to the cool water inlet pipe 93, and fitting 76 is connected to pipe 94 that goes to the domestic hot water tap (not shown). As hot water is drawn from the coil, it will be automatically refilled with cool water entering from pipe 93 under normal line pressure to be instantly heated by the boiler water as will appear.

Each of coils 71 and 72 is made of thin-walled copper tubing having an outer diameter of ⅜ inch to ½ inch, and the coils are substantially rigid self sustaining units extending down into the boiler water. The arrangement provides a large area for heat exchange, preferably at least ten square feet or more for the entire coil assembly 13. As illustrated in Figure 1, coil assembly 13 forms a generally arcuate or kidney-shaped unit that follows the circumferential contour of space 37 without touching any of the boiler side walls.

The rotary wall flame oil burner unit 16 may be of the type illustrated in Powers et al. Patent 2,491,517 issued December 20, 1949 or the patent of Edmond H. Haugen No. 2,616,402 issued November 4, 1952, and it projects upwardly through a suitable opening in a hearth assembly rigidly secured across the bottom of primary combustion chamber 19. The hearth assembly comprises a steel plate 95 secured as by bolts 96 to a boiler base structure 97 that supports the entire heater assembly on the floor. The burner unit 16 is secured to plate 95 as by the wing bolts 98. A cylindrical steel shell 99 unstanding from plate 95 surrounds a layer 101 of fire resistant cement or other refractory material which serves as the hearth surface, and an annular flame rim 102 is welded above the inner periphery of shell 99 to a series of spaced upright brackets 99' which serve as attachment members for securing shell 99 and flame rim 102 to the plate 95. See Figure 2. A series of grilles 103 are mounted on the flame rim in accord with usual practice.

The plate 95, shell 99, cement hearth 101 and the flame rim 102 are preferably factory assembly, and in installation in the field the hearth is completed by filling refractory cement into the space between shell 99 and wall 21 as illustrated in Figure 2.

Above the hearth, oil droplets from the rotating flinger tubes 104 are atomized at the flame rim 102 and admixed with air pumped outwardly by fan 105. An igniter 100 is provided adjacent the flame rim. This burner assembly provides an even annular flame around the lower periphery of wall 21 which is free of openings and projections and is heated uniformly by the hot products of combustion that pass upwardly over it and through throat 35 into the secondary combustion chamber 22. Instead of the hearth assembly above described, a steel hearth and shield ring assembly such as disclosed in Patent No. 2,616,402 may be used.

The top of the secondary combustion chamber is closed by a suitable cover assembly 110 as illustrated in Figure 3. A tubular baffle 106 having a top plate 106a and an opening 107 facing forwardly away from the flue passage between walls 24 and 25 extends between the cover and boiler wall 31. Baffle 106 is freely seated on wall 31 so as to be removable when the cover is taken off. A plate 108 secured to baffle top plate 106a projects over the top of the passage between walls 24 and 25. The purpose of the cover and baffle assembly is to extend over the top of the secondary combustion chamber and to direct flow of the hot combustion gases along the wall 23 as indicated by the arrows in Figure 1. Cover assembly 110 is secured to the top of the boiler unit as by studs 110a.

Preferably the cover assembly and its association with the boiler is the same as disclosed in said Haugen Patent No. 2,616,402, to which attention is directed for any detail needed to understand the present invention.

A novel smoke hood and draft stabilizer assembly is mounted at the rear of the boiler. This assembly comprises in essence a head 111 which has at opposite sides arcuate flanges 112 and 113 (Figure 6) secured as by bolts 114 to the adjacent wall 17 of the boiler. Head 111 is forwardly open at 115 so as to provide an outlet which is continuous with the passage between walls 24 and 25 for conducting the products of combustion from the secondary combustion chamber. Head 111 has a rearwardly projecting bottom wall 116 that terminates at the juncture of the head with a vertical tubular passage defining member 117 that extends down to the bottom of the cabinet. Tube 117 is closed at its lower end except for an opening wherein is fitted a short collar 118 opening into cabinet space below the boiler. Air may enter collar 118 and pass up the tube 117 into head 111 to join the outgoing combustion products.

An automatic draft stabilizer assembly 119 is provided in the inner end of collar 118 and comprises a support plate 120 inserted into the open end of collar 118 and held there as by screw 121. A damper plate 122 having pivots 123 at opposite sides journalled in support 120 serves to limit entry of air into collar 118. Plate 122 has a recessed portion through which extends a threaded rod 124 on the opposite ends of which are mounted weights 125 and 126. Rod 124 is clamped to plate 122 as by nuts 127.

In operation, when the flue is cold, the weights are so located and balanced that weight 125 exerts the strongest leverage to urge the damper counterclockwise until a projection 128 encounters a fixed stop 129 on the support. In this situation, damper 122 is almost closed and little or no air passes up tube 117. As the flue temperature increases, the draft increases and the air flow tends to rock plate 122 toward a more open position where it admits more air. Eventually a condition is reached where damper plate 122 assumes a fairly constant open position, which may be determined by preadjustment of the weights on rod 124. I have thus provided an arrangement for maintaining a substantially constant velocity draft in the heater.

At the upper end of tube 117 at the junction of the draft air and the combustion products is mounted a deflector plate 131 having a flange secured to wall 116 and a deflector ledge 132 that extends upwardly and rearwardly at about 45 degrees whereby the air coming up through tube 117 will be deflected outwardly thereby providing a controlled draft which will aid in movement of the products of combustion outward through the flue. The deflector plate 131 prevents cold draft air from striking thermostat bulb 144 and assures minimum turbulence upon mixing of the two air streams. At its rear, head 111 is open to receive a short flue connecting tube 133 that projects rearwardly through the cabinet wall (Figure 1). The above described draft stabilizer assembly 119 may be the same as that disclosed in United States Letters Patent No. 2,514,446 issued to E. A. Field on July 11, 1950, to which reference is made for further detail. The novel smoke hood and draft stabilizer assembly of the invention may be used in a furnace as well as a boiler.

One decided advantage of this arrangement that particularly adapts it for the kitchens of small houses is that the entire draft assembly is within the cabinet and the entire unit may be backed up flush against a wall in the kitchen with the projecting flue tube 133 thrust into a fireproof flue in the kitchen wall. This is a novel and useful space saving feature which is made possible by the arrangement above described in conjunction with the other parts of the apparatus.

A diaphragm actuated switch assembly 134 is mounted on the cabinet frame near the top of the boiler. A thermostat bulb 135 is mounted in the boiler water adjacent the suspended coil 13 and near the portion of the coil connected to the cold water inlet 93, so as to be quickly responsive to any change in the boiler water induced by entry of cold water into coil assembly 13. Thermostat 135, which may be of any suitable conventional type, is connected by a fluid conduit 136, fitting 137 and fluid conduit 138 to switch assembly 134 which is included in a control circuit shown in Figure 1.

A second thermostat bulb 139 is mounted in the boiler water about an inch below the top of the boiler as illustrated in Figure 2, so as to lie near the outlet of the coil assembly 13. It is connected by fluid conduit 141, fitting 142 and fluid conduit 143 to switch assembly 134.

The circuit controlled by the switch assembly 134 and manual switch S comprises two selectively operable circuits, one including the burner 16 and the other including both the burner 16 and the pump motor 44. These two circuits are in parallel.

The operation will now be further described. For summertime operation, or other periods when space heating in the house is not required, it has been found that the domestic hot water supply may be adequately maintained by action of convection currents within the boiler water space. Assume to start that the boiler water is hot and has suitably heated the water within the suspended coil assembly 13. Switch blades a and b of the manual switch S are in open position to include the burner in the control circuit but not the pump motor.

When domestic hot water is drawn out of the coil assembly 13, the incoming cold water from pipe 93 chills the coil and cools the surrounding boiler water. When the temperature of the surrounding boiler water drops below a predetermined amount, say 190° F., the thermostat 135 acts to cause the burner 16 to be energized to start heating the boiler water. Convection currents within the boiler water space will cause hotter water at the bottom of the boiler to displace upwardly toward the coil 13 and this circulation by convection within the boiler soon results in even heating of all the boiler water and rapid raising of the temperature of the water in the coil assembly 13. When heat exchange stability is established between the water in coil 13 and the surrounding boiler water which has been raised above the predetermined setting for the thermostat, the burner is deenergized. This feature of rapidly following the change in temperature of the boiler water is extremely important in small capacity boilers such as that at 12.

The above provides an operational control insuring almost instantaneous hot water for the domestic tap. The thermostat at 139 provides a limit control in that it prevents the hot water emerging from the coil assembly 13 from exceeding a safe limit. This control may be for example set to deenergize the burner control circuit when the surrounding water at the top of the boiler is at 220° F. or above. I have thus provided a dual control for the domestic hot water which insures speedy response to use of the water and a safe limit control.

When the boiler water capacity is small it may be desirable as in the summertime to speed up heating of the domestic hot water by providing forced recirculation of the boiler water. This is done by closing blade a of the above described manual switch S to include both the burner and pump motor 44 in the control circuit. The operation is then substantially as above, except for forced recirculation of the boiler water from the bottom of the boiler through conduits 57 and 54, pump 43 and conduit 49. Valve 48 should be closed at this time to avoid space heating circulation.

When it is desired both to heat domestic hot water and supply hot water to space heating means such as radiators or panels, as in the winter time, the above mentioned manual switch S is placed in the condition of Figure 1A to include both the burner and the pump motor in the control circuit. The thermostats 135 and 139 act to control as above when temperature of the boiler hot water changes. Valve 48 is open so as to obtain the split flow described above in describing the pump connections. A conventional control thermostat 208 in Figure 1A responsive to space heating demands independently of the thermostats 135 and 139 is also provided. Thus, whenever the burner and pump motor are now energized, water from the boiler water space is recirculated through the boiler and at the same time circulated through the radiator or panel system. The pump must be large enough to handle both flows. In a specific embodiment of the invention, wherein hot water is drawn out of the bottom of the boiler and admixed with return water from the space heater panels so that the water at the pump outlet was 20° F. higher than the return water and 40° F. cooler than the boiler water drawn out of the bottom of the boiler, and the outlet of the pump was split between recirculation of boiler water and circulation of the space heater water, a satisfactory pump flow rate was about 8.6 gallons per minute, of which 3.4 gallons per minute were recirculated boiler water and 5.2 gallons per minute were space heater water. This ratio can be varied by adjustment of valves 53 and 48, and, in any installation, the flow rate is calculated according to the maximum expected loads in the boiler and panel circuits. In the above, the maximum expected boiler output was 80,000 B. t. u. of which 12,000 B. t. u. represented domestic hot water requirements and the maximum expected space heater load was 52,000 B. t. u. My invention requires a larger pump than would be used in the conventional house heater boiler where the pump merely forces water through the space heater circuit.

A thermostat bulb 144 is inserted into the head 111 above and forwardly of deflector ledge 132 which prevents the upcoming cool air from directly impinging on the thermostat bulb. So protected by ledge 132, thermostat 144 is directly and accurately responsive to the temperature of the outgoing flue gases. As illustrated in Figure 1, the thermostat bulb 144 is connected to a master relay device 145 which controls the entire electrical circuit of the heater.

Referring to Figure 1A which discloses my electrical control circuit in more detail, the motor pump 44 and the motor of burner 16 are connected by a common lead 200 to one side of the line as ground 201. The other common lead 202 between these motors places them in parallel. The line 202 is, however, provided with a switch $a$. The master relay device 145 is connected by lead 203 to the other side of the line indicated at 204 through pressure diaphragm switch 134, to lead 202 by lead 205 and to the igniter 100 by lead 206. For independent operation of motor pump 44, switch $b$ connects lead 207 to the hot side of the line indicated at 204 through a conventional type thermostat 208 located on an inside wall of the house to be heated.

For winter operation the parts are as in Figure 1A, and valves 48 and 53 are both open. Switch blade $a$ is open, and switch blade $b$ is closed so that as soon as thermostat 208 closes and calls for heat the pump motor 44 starts circulation of water through the space heaters.

If the temperature of the water near bulb 135 is or falls below a certain amount that bulb causes actuation of switch 134 to close the circuit to energize the master relay device 145. In its first stage of energization a time delay relay closes a set of contacts to connect lead 203 to leads 205 and 206 for a predetermined period, thus starting the burner motor and activating the igniter. After elapse of the predetermined time these contacts open, the igniter is deactivated and another set of contacts closes to establish a parallel circuit connecting lead 203 to lead 205, thus continuing operation of the burner motor. This parallel circuit however contains a normally open switch which is closed only when the flue temperature is above a minimum temperature and is controlled by bulb 144, so that should the burner fail to ignite during the predetermined period when both the burner motor and igniter are energized the burner motor will now stop and the burner will not be flooded with fuel.

This operation will continue until the master relay device is deenergized by thermostats 208 and 139.

For summer operation, switch S is manipulated to close blade $a$ and open blade $b$, so that the pump 44 is operated only when lead 205 is energized and runs only when the burner motor is running. Of course when valve 53 is shut off during summer operation, switch blade $a$ is also opened so that the pump becomes wholly inoperative.

Figure 7 illustrates an alternative domestic hot water heating coil assembly 146 wherein, instead of being made up of two separate coils, the coil assembly comprises a single continuous coil made up of eight vertical banks of convoluted tubing in series with its opposite ends secured to fixtures 147 and 148 that are clamped to plate 149 as by nuts 151 and 152 threaded on the projecting fixture nipples above the plate. The coil assembly is stiffened by straps 153 and 154 which extend adjacent the respective ends from fixtures down and around the bottom of the stack of coils and are secured to the fixtures. The coil assembly of Figure 7 is suspended in the boiler water in the same manner as that of Figures 1–6. The coil assembly 146 is arcuate to follow the circumferential contour of the boiler walls and fit within the space 37 without contacting the boiler walls, as in the earlier embodiment.

The heater above described is compact and efficient and may be safely placed in a room having a combustible floor. The body of the boiler is insulated, as by a blanket of insulating fiber secured around wall 17, and very little heat is radiated into the kitchen. No separate hot water storage tank is required, as the boiler action is instantaneous and reliable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a combination heater apparatus for heating water to be circulated through space heating devices and for instantaneously heating domestic hot water, a boiler for containing a body of hot water, a burner for said boiler, means for recirculating said hot water between said space heating devices and said boiler, means for recirculating hot water through said boiler comprising means for pumping water from the bottom of the boiler directly into the upper part of said boiler, a coil assembly comprising a plurality of turns of tubing grouped as a compact unit mounted in said upper part of said body of water, means connecting the inlet of said coil assembly to a supply of water under pressure and connecting the outlet to a domestic tap, whereby hot water drawn off at said tap permits entry of cooler water into said coil assembly through said supply water inlet, and thermostat means disposed in said upper part of said body of water closely adjacent said coil assembly responsive to a change in the temperature of the upper part of said body of water to control the operation of said burner and pumping means.

2. In a hot water heating system, a boiler having an inlet connection at its upper part and an outlet connection near its lower part, a motor driven pump, a first conduit connecting the pump intake with the boiler outlet, a space heater return conduit connected to said first conduit for admixing cooler return water with the hot boiler water before entering the pump, a space heater supply conduit connected to the discharge end of said pump, and a conduit connecting the discharge end of said pump to said boiler inlet whereby water may be recirculated between the pump and the boiler.

3. In a combination space and domestic water heater, a boiler having a water space, a burner for heating the boiler water, a pump having its inlet connected to said boiler water space, means connecting the outlet of said pump to said boiler water space, a domestic water heating coil in said boiler water space, and means responsive to temperature of the boiler water in the localized area adjacent and surrounding the inlet portion of the domestic water heating coil for controlling both said burner and said pump.

4. In heating apparatus, a boiler having a water space adapted to be heated by a burner, a pump having its inlet connected to one part of said water space and its outlet connected to another part of said water space, a domestic water heating coil having cool water inlet and tap outlet connections mounted in said boiler water space so that the domestic water therein may be indirectly heated by boiler water, and means responsive to a drop in boiler water temperature in the localized area adjacent and surrounding the inlet portion of the domestic water heating coil due to withdrawal of domestic water through the outlet connection and water flow through the cool water inlet for controlling said burner and pump to heat the water in said boiler water space and recirculate it continuously during such heating until it attains a predetermined temperature.

5. In a heating apparatus, a burner, a boiler having a water space adapted to be heated by said burner, a pump having an inlet conduit connected to one part of said water space and an outlet conduit connected to another part of said water space, a domestic hot water heating coil mounted in said water space and having a supply water inlet connection and a tap water outlet connection, means responsive to boiler water adjacent said coil for controlling energization of said burner, a space heater supply conduit connected to the outlet of said pump and a space heater return conduit connected to the inlet of said pump, a first control valve in the pump outlet conduit downstream of its connection to the space heater supply conduit, and a second control valve in the space heater supply conduit.

6. In a combination space and domestic hot water heater apparatus, a boiler for containing a body of water, an electric motor driven burner for said boiler, an electric motor driven water circulation pump operatively connected to said boiler, a domestic hot water heating coil mounted in said body of boiler water, and a control circuit comprising means responsive to the boiler water temperature in the localized areas of said body adjacent and surrounding the inlet and outlet portions of said coil and the flue temperature in said apparatus for controlling said burner motor.

7. In the apparatus defined in claim 6, means connecting said pump motor to be also controlled by said control circuit, space heat responsive means independent of said boiler water temperature responsive means connected for controlling operation of said pump motor independently of said burner motor, and means for rendering said space responsive means inoperable to control said pump motor.

8. In a hot water heating system, a boiler, a boiler pump assembly, a burner for said boiler, space heating means, a first conduit means interconnecting said boiler pump assembly with said boiler and said space heating means so that when the pump is energized boiler water may be circulated through said heating means, a second conduit means interconnecting said boiler pump assembly between the top and bottom of said boiler so that when said pump is energized the boiler water may be directly recirculated, a valve for closing said first conduit means against flow of boiler water from said pump, a control circuit for said burner and pump assembly and comprising shiftable switching means, and means responsive to a drop in boiler water temperature when said switching means is in one position to energize both said burner and said pump assembly, said means being normally operable when said valve is closed so that all of the water withdrawn from the boiler may be directly recirculated therethrough for speedy heating of the boiler water.

9. In the system defined in claim 8, means operable in response to a drop in boiler water temperature when said switching means is in another position adapted to energize only said burner and means responsive only to requirement for space heating for energizing said pump assembly, said last named means being normally operable when said valve is open.

10. In a combination water heater apparatus, a boiler containing a body of water, a coil assembly comprising a number of turns of tubing mounted in said body of water, cool water inlet and domestic hot water outlet conduits attached to opposite ends of said coil, a burner associated with said boiler for heating said body of water, a first thermostat for controlling operation of said burner disposed in said body of water closely adjacent the part of said coil assembly attached to said inlet so as to be immediately responsive to a drop in temperature of that part of said body of water which is first cooled by entry of cool water through said inlet, and a second thermostat disposed in said body of water adjacent the part of the coil assembly attached to said outlet for deenergizing said burner whenever the temperature of the water adjacent said coil outlet exceeds a certain limit to thereby prevent the temperature of the water in the coil from becoming excessive.

References Cited in the file of this patent
UNITED STATES PATENTS

| | | |
|---|---|---|
| 2,081,831 | Moore | May 25, 1937 |
| 2,159,284 | Miller | May 23, 1939 |
| 2,246,138 | Lum | June 17, 1941 |
| 2,327,339 | Chandler | Aug. 24, 1943 |
| 2,376,632 | Sullivan | May 22, 1945 |
| 2,455,040 | Broderick | Nov. 30, 1948 |
| 2,540,055 | Mohn | Jan. 30, 1951 |